United States Patent [19]
Jorgensen

[11] 3,907,676
[45] Sept. 23, 1975

[54] PROCESS FOR PURIFYING INSULIN
[75] Inventor: Klavs Holger Jorgensen, Virum, Denmark
[73] Assignee: Novo Terapeutisk Laboratorium A/S, Bagsvaerd, Denmark
[22] Filed: May 14, 1973
[21] Appl. No.: 360,340

Related U.S. Application Data
[60] Continuation-in-part of Ser. No. 59,015, July 28, 1970, abandoned, which is a division of Ser. No. 845,345, July 28, 1969, abandoned.

[52] U.S. Cl............. 210/31 C; 260/112.7; 424/178
[51] Int. Cl.$^2$.............. B01D 15/08; C07C 103/52; C07G 7/00
[58] Field of Search...................... 210/31 C; 55/67; 260/112.7; 424/178

[56] References Cited
FOREIGN PATENTS OR APPLICATIONS
1,054,523   1/1967   United Kingdom.............. 260/112.7

OTHER PUBLICATIONS
Smith, Biochim Biophrs., ACTA 82 231–236(1964).
Ismarlov et al. Azeab. Med. ZH. Vol. 45, No. 1 pp. 8–13, 1968.
Heftmann, "Chromatography," CH 15, pp. 378–423 Chromatography of Proteins – Reinhold Pub. Co. 1962.

Primary Examiner—John Adee
Attorney, Agent, or Firm—Synnestvedt & Lechner

[57] ABSTRACT

The present invention relates to a process of reducing the antigenicity of insulin recovered from pancreas glands of domestic mammals, particularly pork and bovine pancreas glands, and containing antigenic insulin-like substances with a molecular weight about 6,000 together with some antigenic proteins of pancreatic origin with a molecular weight above 6,000. The reduction in antigenicity is obtained by subjecting the insulin to column chromatography on an anion exchanger which is preferably strongly basic while using a water-containing monohydric aliphatic alcohol as eluent, and collecting the eluate fractions containing insulin free or essentially free of the impurities referred to. The purified insulin may be used in all kinds of insulin preparations for clinical use.

13 Claims, 4 Drawing Figures

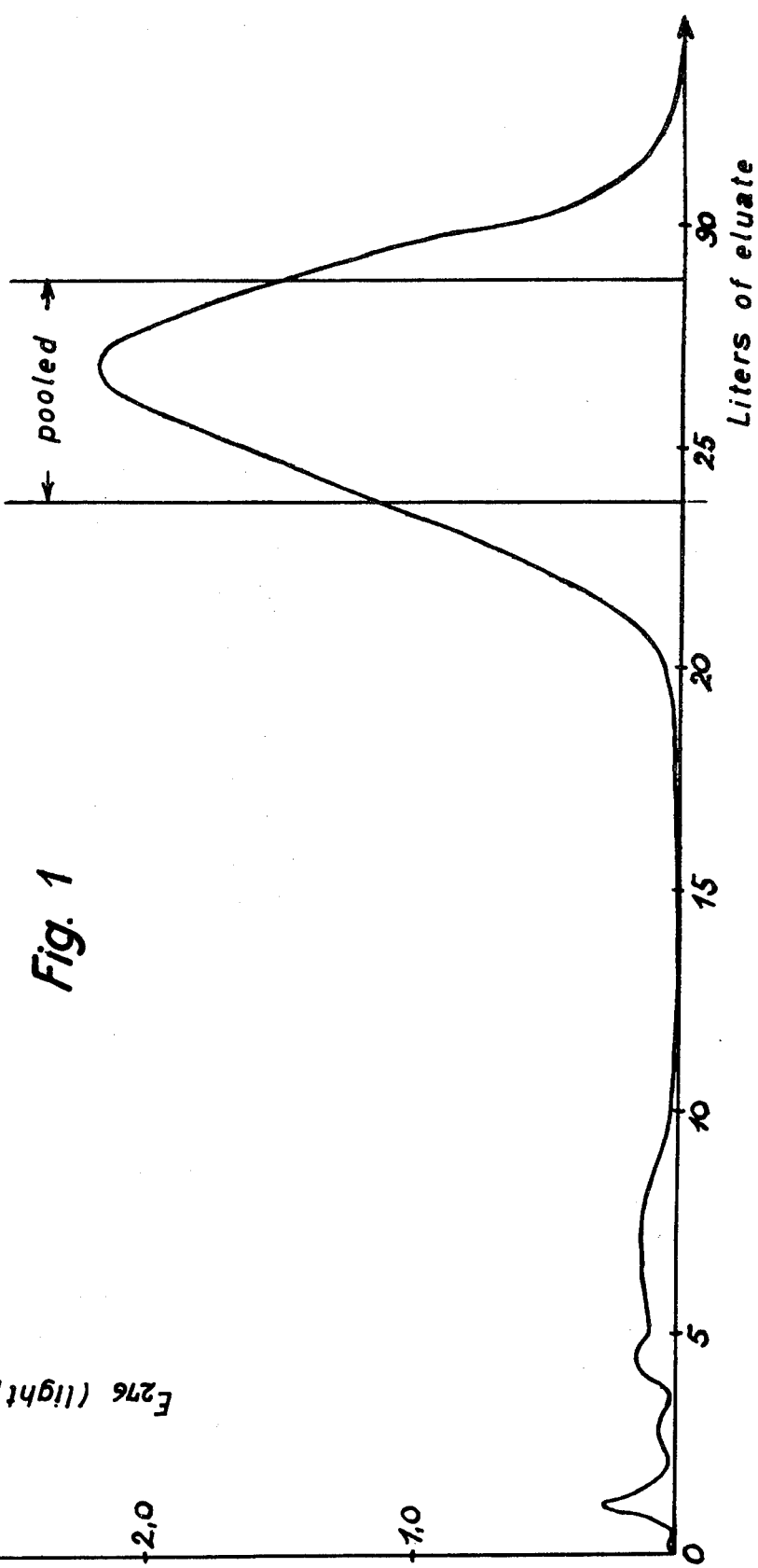

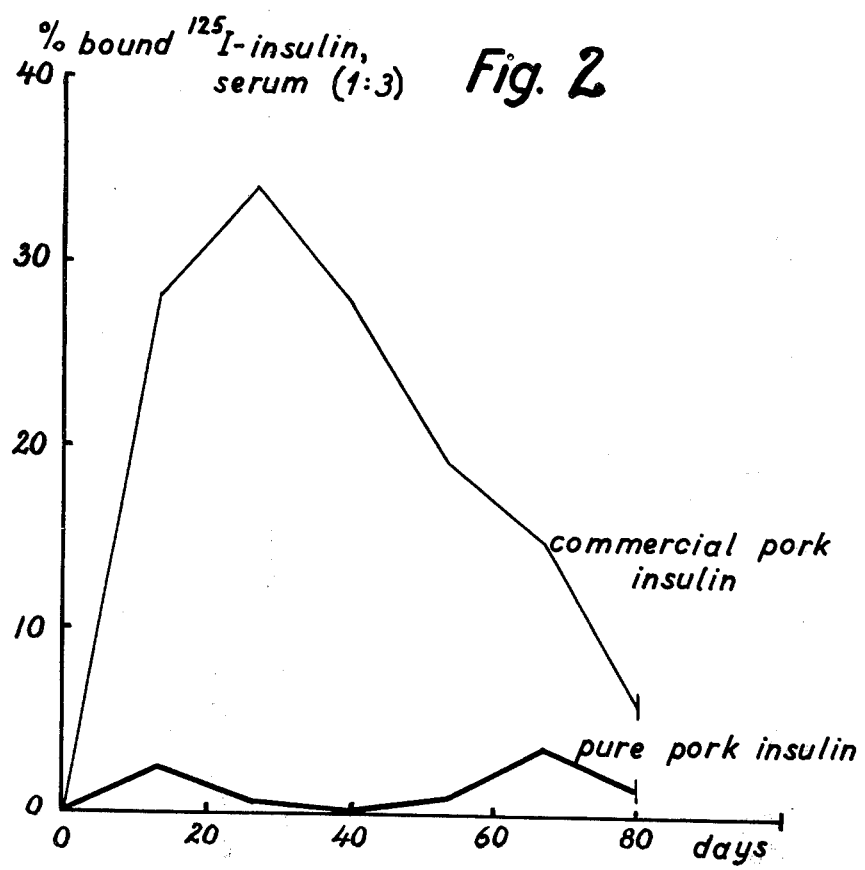

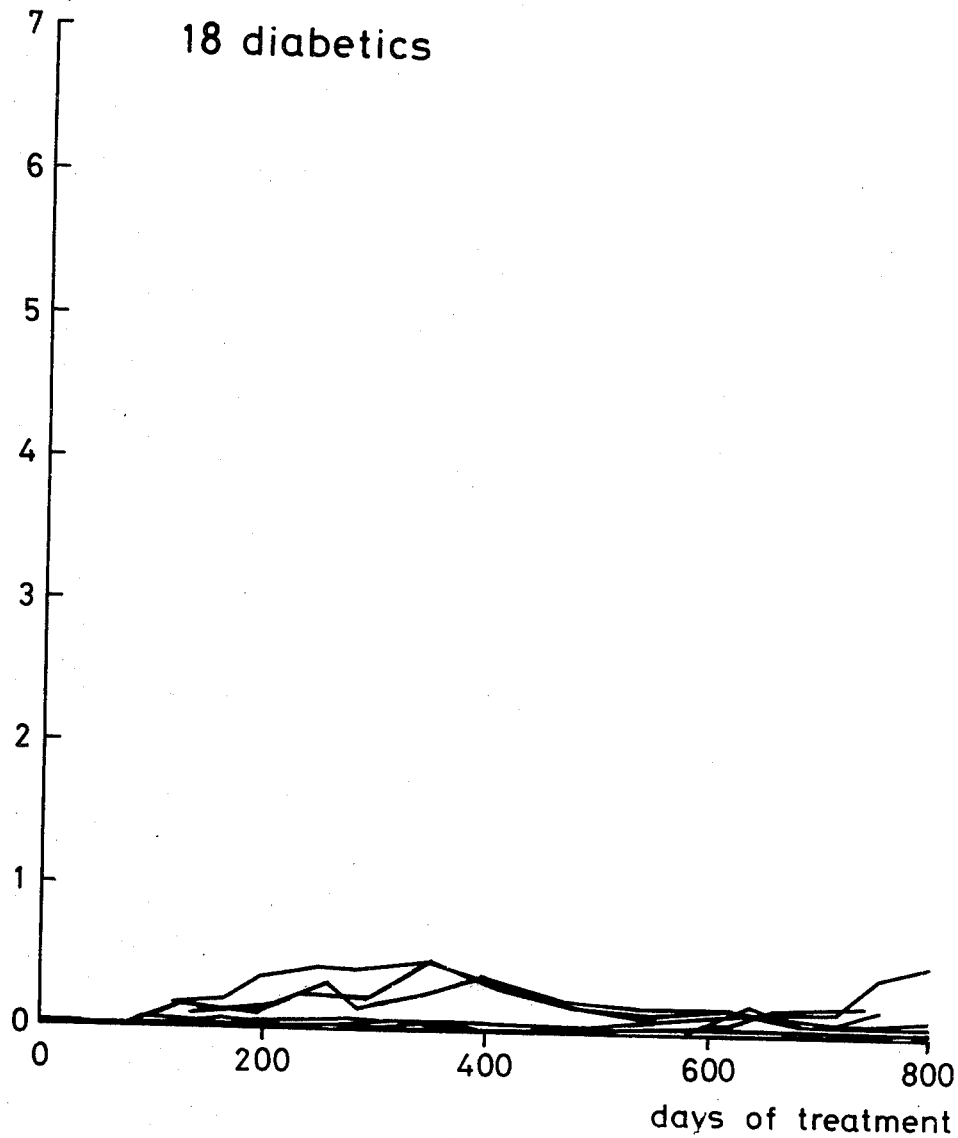

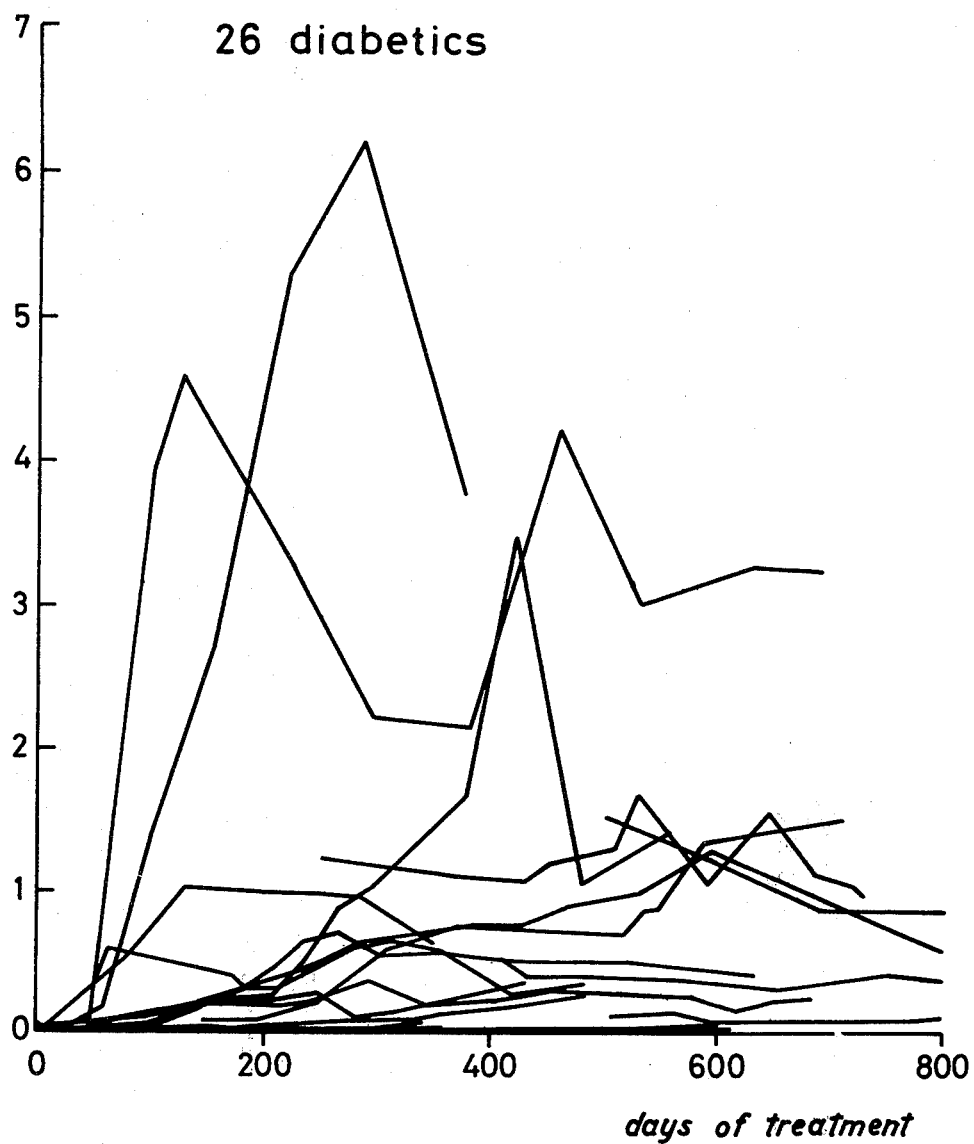

PROCESS FOR PURIFYING INSULIN

This application is a continuation-in-part of U.S. application Ser. No. 59,015 filed July 28, 1970, said application being a division of application Ser. No. 845,345 filed July 28, 1969, both now abandoned.

My invention relates to a process for reducing the antigenicity of insulin recovered from pancreas glands of domestic mammals, particularly from pork and bovine pancreas glands.

Originally, the general opinion was that properly recrystallized insulin in the form of sharp-edged rhombohedrons bounded by plane crystal faces constituted the pure protein, insulin, the configuration of which was determined by Sanger and co-workers, vide e.g. Biochemical Journal 60 (1955), 556. Later it was found, however, that it was not so. Scientific analytical investigations showed that the crystalline insulin referred to contains proteins of pancreatic origin with a molecular weight above that of the pure insulin and in addition thereto insulin-like substances of about the same molecular weight as that of pure insulin (about 6,000).

Thus, it has been demonstrated that crystalline insulin dissolved in 1 M acetic acid may be fractioned into components (a), (b) and (c), respectively, by gel filtration on a column of Sephadex G-50 which is dextran cross-linked with epichlorohydrine to give an exclusive limit of penetration of about 10,000 (minimum mole weight of excluded substances), being in bead form (diameter 20 to 80 $\mu$) and produced by PHARMACIA, Uppsala, Sweden. These three components may be isolated from their solutions by conventional methods, e.g. salting out, precipitation with a zinc salt at neutral reaction, freeze-drying etc. Both component (a) and component (b) contain proteins of pancreatic origin having a molecular weight above 6,000. The proteins contained in component (a) are of unknown structure and composition. Among the proteins contained in component (b) are proinsulin, different intermediates produced from proinsulin and the non-convertible dimer. Component (c) contains the pure insulin contaminated by insulin-like substances of about the same molecular weight as that of the pure insulin, viz. mono- and didesamido insulins, insulin ethyl esters, being insulin with one or more of the carboxylic groups in the insulin molecule esterified with ethanol, and arginine insulin being insulin with an arginine residue in position $B_{31}$, and even diarginine insulin being insulin with an arginine residue both in position $B_{31}$ and in position $B_{32}$.

Usually the amount of component (a) constitutes about 2–5 per cent by weight of crystallized insulin. By repeated recrystallization the amount of component (a) may be gradually reduced down to less than a fraction of one per cent by weight of the recrystallized insulin. The amount of component (b) usually constitutes about 3–8 per cent of both crystallized insulin and recrystallized insulin. Component (c) comprises the balance, and the amount of the insulin-like proteins in component (c) usually constitutes about 5–13 per cent by weight thereof.

Immunological experiments carried out in animals and forming the background for the present invention have shown that the components (a) and (b) referred to above and to some extent the insulin-like proteins present in component (c) are in principle responsible for the antigenic behaviour of the insulin preparations hitherto known.

The purpose of my invention is to remove in a simple and effective manner the impurities contained in insulin recovered from pancreas glands in order to reduce or even eliminate the antigenicity of the insulin hitherto used in the diabetes therapy.

In my process I subject insulin that has been recovered from pancreas glands of domestic mammals to column chromatography on an anion exchanger and use an eluent containing water together with a water-miscible monohydric aliphatic alcohol in a concentration of 40 to 80 per cent (v/v).

For the purpose of recovering insulin it is known to subject acid or neutralized alcoholic extracts from pancreas glands to column chromatography on synthetic or natural cation exchangers, vide for instance U.S. Pat. No. 2,878,159 and British Patent Specification No. 1,054,523, but these known processes end where my process starts. Besides, the use of cation exchangers in my process will not result in the desired separation of the antigenic impurities from the insulin used as starting material in my process.

It is also known, vide U.S. Pat. No. 3,069,323, to recover insulin from the acidified alcoholic extract from pancreas glands (crude insulin extract) by mixing the crude extract with an anion exchanger, viz. a DEAE-cellulose, filtering the mixture and recovering the insulin by extracting the solids with an acid. However, use is not made of column chromatography in this known process, which also ends where my process starts. In still another process for recovering insulin from an alcoholic pancreas extract, vide Azerb. Med. Zh, 45, No. 1, 8–13 (1968), the extract is subjected to column chromatography on an anion exchanger with 0.1 N acetic acid as eluent, but also this known process ends where my process starts and will not result in a separation of the antigenic substances from the insulin. Besides, the eluent used does not contain a water-miscible monohydric aliphatic alcohol.

In quite a number of previous scientific attempts to isolate and identify the impurities contained in crystallized and recrystallized insulin use has been made of column chromatography on ion exchangers, both cation and anion exchangers, but in none of these known attempts use has been made of an anion exchanger in combination with an eluent containing water together with a water-miscible monohydric aliphatic alcohol, nor has insulin having the purity obtainable in my process been isolated.

From U.S. Pat. No. 3,221,008 it is known to subject unspecified zinc insulin to column chromatography on the cation exchanger "Dowex 50-X1" (a sulphonated styrene-divinylbenzene copolymer in bead form produced by The Dow Chemical Company, Midland, U.S.A.), using aqueous ethanol as eluent, but even when recrystallized insulin is used as starting material, the recovered insulin will show mainly the same impurities and hence the same antigenicity as does the starting material.

Finally, it is known from British Patent Specification No. 871,541 to subject six times crystallized insulin and insulin purified as described by Lens (Biochem. et Biophys. Acta (1948), 2, 76) to column chromatography on a styrene-divinyl benzene copolymer cation exchanger deposited on an inert extender of large superficial area, but the insulin will after this chromatography still contain impurities not preventing the chromatogram from looking as if the material eluted from the column were essentially homonogeneous.

By my process it is possible in a single operation to remove from insulin recovered from pancreas glands of domestic mammals not only accompanying proteins of pancreatic origin with a molecular weight above 6,000, but also accompanying antigenic insulin-like substances with a molecular weight of about 6,000 so that the insulin shows essentially a single component when analysed by discontinuous polyacrylamide gel electrophoresis (DISC PAGE).

The term "essentially a single component" means that the amounts of other components, if any, are insignificant.

For analytical purposes use has previously been made of DISC PAGE also in connection with insulin. This particular gel eleectrophoresis was developed by B. J. Davis and L. Ornstein and is described in Ann. N.Y. Acad., Sci., 121, 321–349 and 404–427 (1964).

As pointed out one of the principal novel features of my process is the use of an eluent containing water and a water-miscible monohydric aliphatic alcohol in a concentration of 40 to 80 per cent (v/v). Among these alcohols which comprise methanol, ethanol, propanols and ter. butanol I prefer to use ethanol, and within the concentration range referred to I prefer a concentration of 50 to 70 per cent (v/v). With alcohol concentrations above about 80 per cent (v/v) the insulin will show decreasing solubility in the elvent, which will result in unsatisfactory yields. With alcohol concentrations below about 40 per cent (v/v) the eluent will not show sufficient monomerizing power.

The insulin that is to be subjected to my process is preferably commercial insulin, i.e., amorphous or crystalline insulin which may have been crystallized several times, commercial insulin being to-day recovered from pork and bovine pancreas glands. However, use may also be made of crude insulin, such as the insulin-containing salt cake which is formed during the recovery of insulin from pancreas glands, and usually contains 10 to 30 per cent by weight of insulin, but the high contents of impurities make this starting material less suited for the purification according to the invention. A better starting material may be obtained by subjecting a solution of the salt cake to an isoelectric precipitation by adjusting the pH-value of the solution to 5.5 and isolating the precipitate by centrifugation.

Anion exchangers well-known in the art can be used in my process. They are usually divided into two groups, viz. the weakly basic group and the strongly basic group. Examples of anion exchangers belonging to the weakly basic groups are 1. Bio-Gel DM produced from polyacrylamides and carrying as functional groups diethylaminoethyl groups,
2. DEAE-Sephadex produced from cross-linked dextrans and carrying diethylaminoethyl groups as functional groups, and
3. DEAE-cellulose produced from cellulose and also carrying diethylaminoethyl groups as functional groups.

Examples of anion exchangers belonging to the strongly basic group are

1. Dowex 1 produced from polystyrenes and carrying benzyl trimethyl ammonium groups as functional groups, and
2. QAE-Sephadex produced from cross-linked dextrans and carrying diethyl-(2-hydroxy-propyl)-aminoethyl groups as functional groups.

I prefer to use an anion exchanger from the strongly basic group.

The insulin is applied to the anion exchanger column which is built up in the conventional manner, in the form of a water-containing solution having a pH-value within the range of 6 to 9, preferably within the range of 6.5 to 8.5, and the insulin is thereby fixed to the column. Before the insulin solution is applied to the column I prefer to equilibrate the column with a buffer solution having a similar composition as that of the eluent, but the measure is not absolutely necessary. The usual skille known in the art is employed in connection with the choice of buffer substances and of the amount of insulin applied to the column in relation to the capacity of the column. Suitable buffer substances can be found in the literature available.

The elution of the column is carried out in fractions with the eluent containing water-miscible monohydric aliphatic alcohol, preferably ethanol, in a concentration of 40 to 80 per cent (v/v), preferably 50 to 70 per cent (v/v)

It is known in the art to elute a loaded anion exchanger column with continuous or stepwise decrease of the pH-value of the eluent during the elution. This technique may be used in my process, but I do not especially recommend its use because it is rather complicated.

It is also known in the art to elute a loaded anion exchanger column with continuous or stepwise increase of the ion strength of the eluent during the elution. When this technique is used in my process, I adjust the pH of the insulin solution to be applied to the column to the same or almost the same pH-value as that of the eluent to be used, and I increase the ion strength of the eluent in a manner known per se during the elution. Apparatus for continuously increasing of the ion strength of the eluent are known in the art and commercially available.

However, in my process it is possible to effect the elution without decreasing the pH-value or increasing the ion strength of the eluent during the elution, which means a simplification of the elution step. In other words, I prefer to carry out the elution without changing the ion strength and the pH-value of the eluent. It is not necessary that the insulin solution applied to the column has exactly the same pH-value as has the eluent since the buffering strength of the eluent will usually compensate for any differences.

Regarding the anion concentration of the eluent, the flow rate and the volume of the eluate fractions during the elution step in my process I use the skill well-known in the art, and as is also general practice in the art, my process is operated at rather constant temperature, which can be chosen within the range of 0° to 30°C, preferably 15° to 25°C.

During the fractional elution I measure the extinctions of the fractions for instance at 276 nm and plot them against the fraction numbers. By continuous registeration of the extinction and by means of a peak selector I can automatically collect in a separate container the part of the elvate corresponding to the central major part of the insulin peak. I have found that the said part of the eluate contains insulin which after recovery shows essentially a single component when analysed by DISC PAGE. In the DISC PAGE analysis referred to in this specification use is made of 7.5 per cent polyacrylamide in the running gel containing 8 M urea and having a pH-value of about 8.7 while the upper gel and the applied insulin solution also contains 8 M urea, the amount of applied insulin being about 0.1 mg.

From the collected part of the eluate I recover the insulin in a manner known in the art.

FIG. 1 illustrates the elution pattern of Example 1;

FIG. 2, the results of the comparative animal tests; and

FIGS. 3 and 4, the results of comparative clinical trials.

The following examples show how my process may be carried out.

EXAMPLE 1

A buffer of the following composition is prepared:
1.25 kg of tris(hydroxymethyl)aminomethane
725 ml of 12.3 N HCl
62.4 liters of 96 per cent (v/v) ethanol
Water to make a total volume of 100 liters
The pH is 7.3 at 25°C.

1.3 kg of the anion exchanger QAE-Sephadex A-25 are swollen in the buffer and the finest particles removed by decantation. The material is used for the packing of a column with a diameter of 15 cm and a height of 25 cm. The column is equilibrated with the buffer. QAE-Sephadex A-25 is dextran cross-linked with epichlorohydrine to give an exclusive limit of penetration of about 5,000 (minimum mole weight of excluded substances) carrying as functional groups diethyl-(2-hydroxy-propyl)-aminoethyl groups, being in bead form (diameter 40 to 120 $\mu$) and produced by PHARMACIA, Uppsala, Sweden.

18 grams of recrystallized pork or beef insulin containing about 0.4 per cent Zn are dissolved in a mixture of 0.72 gram of ethylene diamine tetra acetic acid disodium salt, 10.2 grams of tris(hydroxymethyl)aminomethane and 720 ml of 60 per cent (v/v) ethanol. The insoluble material is removed by centrifugation. 10.7 ml of 6 N HCl are added to the clear solution which is then applicated on the column. The elution is carried out with the buffer at a temperature of 25°C and at a rate 1.2 liters per hour. Fractions of 0.5 liter are collected.

The extinctions at 276 nm ($E_{276}$) are measured and plotted against the volumes of eluate. The fractions corresponding to the central major part of the insulin peak (the largest peak) are pooled (as shown in FIG. 1). The insulin is precipitated from the pool by adding one pool volume of 0.02 M zinc acetate. The precipitate is isolated by centrifugation and crystallized from an acetone-containing citrate buffer, in a known manner.

The yield is 8.2 grams of purified insulin.

The insulin is recrystallized from a buffer of the following composition:
2.0 per cent of insulin
0.8 per cent of $Zn^{++}$ (as chloride) calculated on the weight of insulin
0.1 M sodium acetate
7.0 per cent of sodium chloride
HCl to pH = 5.45 to 5.55.

The insulin is dissolved in water containing HCl and the $ZnCl_2$, whereupon a solution of the proper quantities of sodium acetate and sodium chloride is added.

The crystallization is carried out at about 4°C with mechanical stirring. The crystallization is completed within 5 to 10 hours. The insulin is isolated by filtration, washed with water and dried in vacuo. The yield is 8.0 grams.

The purified insulin showed a single component when analysed by DISC PAGE and a single component when subjected to gel filtration in the conventional manner on Sephadex-G-50 (fine) while using one molar acetic acid as eluent.

EXAMPLE 2

A buffer of the following composition is prepared:
25 grams of tris(hydroxymethyl)aminomethane
29.0 ml of 6 N HCl
1.2 liters of methanol
Water to make a total volume of 2 liters
The pH is 7.3 at 25°C.

40 grams of the anion exchanger mentioned in Example 1 are swollen in the buffer and the finest particles are removed by decantation. The material is used for the packing of a column with a diameter of 2.5 cm and a height of 25 cm. The column is equilibrated with the buffer.

500 mg of insulin crystallized once from a citrate buffer are dissolved in a mixture of 20 mg of ethylene diamine tetra acetic acid disodium salt, 94 mg of tris(hydroxymethyl)aminomethane, 10 ml of 60 per cent (v/v) methanol and 0.073 ml of 6 N HCL (final pH = 7.3). The insoluble material is removed by centrifugation and the clear solution is applicated on the column. The elution is carried out with the buffer at a temperature of 25°C and at a rate of 30 ml/h. Fractions of 5 ml are collected.

The extinctions at 276 nm are measured and plotted against the fraction numbers. The fractions corresponding to the central major part of the insulin peak (the largest peak) are pooled and the insulin precipitated by adding 100 ml of water and 2 ml of 1 M zinc acetate per 100 ml of the pool. The precipitate is isolated by centrifugation and crystallized from an acetone-containing citrate buffer, in a known manner. The yield of purified insulin is 250 mg. The insulin showed a single component when analysed by DISC PAGE and a single component when subjected to gel filtration as described in Example 1.

EXAMPLE 3

A buffer of the following composition is prepared:
0.06 M tris(hydroxymethyl)aminomethane
0.02 N HCl
0.075 M NaCl
60 per cent (v/v) ethanol
The pH is 8.3 at 25°C.

80 grams of the anion exchanger mentioned in Example 1 are swollen in the buffer and the finest particles are removed by decantation. The material is used for the packing of a column with a diameter of 2.5 cm and a height of 50 cm. The column is equilibrated with the buffer.

2.5 grams of insulin crystallized once from a citrate buffer are dissolved at 0°C in a mixture of 450 mg of tris(hydroxymethyl)aminomethane, 100 mg of ethylene diaminetetra acetic acid tetrasodium salt, 25 ml of buffer, 25 ml of 60 per cent (v/v) ethanol and 0.08 ml of 4 N HCl (final pH at 25°C = 8.4). The insoluble material is removed by centrifugation at 2° to 4°C and the clear supernatant is applicated on the column. The elution is carried out with the buffer at a temperature of 4°C and at a rate of 26 ml/h. Fractions of 20 ml are collected.

The extinctions at 276 nm are measured and plotted against the fraction numbers. The fractions corresponding to the central major part of the insulin peak (the largest peak) are pooled and the insulin precipitated by adding one pool volume of 0.02 M zinc acetate, 0.03 N HCl. The precipitate is isolated by centrifugation and crystallized from an acetone-containing citrate buffer, in a known manner.

The yield is 1.3 grams of purified insulin. When analysed by DISC PAGE the insulin showed a single component, and when subjected to gel filtration as described in Example 1 the insulin showed a single component.

EXAMPLE 4

A buffer of the following composition is prepared:
14.9 grams of histidinium monochloride
38.7 ml of 1 N NaOH
16.1 grams of NaCl
3.12 liters of 96 per cent (v/v) ethanol
Water to make a total volume of 5 liters
The pH is 6.5 at 25°C.

35 grams of the anion exchanger mentioned in Example 1 are swollen in the buffer and the finest particles are removed by decantation. The material is used for the packing of a column with a diameter of 2.5 cm and a height of 25 cm. The column is equilibrated with the buffer.

500 mg of insulin crystallized once from a citrate buffer are dissolved in a mixture of 20 mg of ethylene diamine tetra acetic acid disodium salt, 6.5 ml of the buffer and 6 ml of 60 per cent (v/v) ethanol, the pH being adjusted to 6.8 with 1 N NaOH. The insoluble material is removed by centrifugation and the clear solution is applicated on the column. The elution is carried out with the buffer at a temperature of 25°C and at a rate of 30 ml/h. Fractions of 5 ml are collected.

The extinctions at 276 nm are measured and plotted against the fraction numbers. The fractions corresponding to the central major part of the insulin peak (the largest peak) are pooled and the insulin precipitated by adding one pool volume of 0.02 M zinc acetate. The precipitate is isolated by centrifugation and crystallized from an acetone containing citrate buffer, in a known manner. The yield of purified insulin is 210 mg. When analysed by DISC PAGE the insulin showed essentially a single component, and when subjected to gel filtration as described in Example 1 the insulin showed essentially a single component.

EXAMPLE 5

A buffer of the following composition is prepared:
0.1 M NH$_4$Cl
0.0036 N NH$_3$
60 per cent (v/v) ethanol
pH 7.7 at 25°C.

40 grams of anion exchanger mentioned in Example 1 are swollen in the buffer and the finest particles removed by decantation. The material is used for the packing of a column with a diameter of 2.5 cm and a height of 25 cm. The column is equilibrated with the buffer.

1 grams of recrystallized beef insulin containing about 0.4 per cent of Zn is dissolved in 10 ml of 60 per cent (v/v) ethanol, 10 ml of the buffer, 0.5 ml of a 0.2 M solution of ethylene diamine tetra acetic acid disodium salt, and 0.04 ml of 14 N ammonia (final pH 7.7). The insoluble material is removed by centrifugation, and the clear solution is applicated on the column. The elution is carried out with the buffer at a temperature of 25°C and at a rate of 25 ml/h. Fractions of 10 ml are collected.

The extinctions are measured at 276 nm and plotted against the fraction numbers. The fractions corresponding to the central major part of the insulin peak (the largest peak) are pooled, and the insulin precipitated by adding one pool volume of 0.02 M zinc acetate 0.003 N HCl. The precipitate is isolated by centrifugation and crystallized from an acetone-containing citrate buffer in a known manner.

The yield is 0.6 gram of insulin showing a single component when analysed by DISC PAGE. When subjected to gel filtration as described in Example 1 the insulin showed a single component.

EXAMPLE 6

A buffer of the following composition is prepared:
12.81 kg of tris(hydroxymethyl)aminomethane
14.8 liters of 6 N HCl
624 liters of 96 per cent (v/v) ethanol
Water to make a total volume of 1,000 liters.
The pH is about 7.3 at room temperature.

15 kilograms of the anion exchanger mentioned in Example 1 are stirred in 200 liters of the buffer. The mixture is allowed to stand in order to ensure complete swelling of the beads. After one day the mixture is stirred and the anion exchanger is allowed to settle for 2 hours. Then about 100 liters of the supernatant are removed. Stirring, sedimentation and decantation are repeated twice, the removed supernatants being replaced with fresh buffer. After the last sedimentation the material is stirred and poured into a column with a diameter of 45 cm and a height of 100 cm. The gel is allowed to settle and is then equilibrated by running-through of about 200 liters of the buffer at a temperature of about 21°C and at a rate of 11 liters per hour. The final bed height is about 40 cm.

300 grams of recrystallized insulin recovered from pork or bovine pancreas glands and containing about 0.8 per cent of zinc are suspended in 0.55 liter of water. A solution of 64 grams of tris(hydroxymethyl)aminomethane and 23 grams of ethylene diamine tetra acetic acid disodium salt in 3.7 liters of water is added to the suspension. The insulin is dissolved by stirring and is then mixed with 5.5 kilograms of 96 per cent (v/v) ethanol. The pH is adjusted to about 7.3 at room temperature by cautious addition of 6 N HCl (about 50 ml). A small amount of insoluble material is removed by centrifugation and the clear solution is applicated on the column. The elution is carried out at a temperature of about 21°C and at a rate of 11 liters per hour.

The eluate is led through a quartz flow cuvette (light path : 3.3 mm). The extinction at 276 nm is registered continuously by a spectrophotometer. By means of a peak selector the part of the elvate showing an extinction higher than 0.4 (corresponding to the central major part of the insulin peak) is automatically collected in a separate container. The collected insulin-containing solution is then diluted with an equal volume of 0.02 M zinc acetate. The precipitate is isolated by centrifugation and crystallized from an acetone-containing citrate buffer in a known manner. The yield of purified insulin is 180 grams, which showed a single component by DISC PAGE and also a single component when subjected to gel filtration as described in Example 1.

EXAMPLE 7

100 grams of the anion exchanger AG 1 × 2 (chloride form, mesh: 200/400) are swollen in 0.1 N HCl; 60 per cent (v/v) ethanol to give a total volume of 500 ml. After sedimentation of the beads, about 200 ml of the supernatant are removed. The material is stirred and used for the packing of a column with a diameter of 2,5 cm and a height of 27 cm. The column is then equilibrated at 22°C with the following buffer:

0.1 M NH$_4$Cl
0.02 M NH$_3$
60 per cent (v/v) ethanol.
The pH is 8.3 at room temperature.

About 800 ml, running through at a rate of 44 ml/h are used for the equilibration. AG 1 × 2 is produced by BIO-RAD Laboratories, Richmond, California, U.S.A., by sizing and purification of Dowex 1 × 2, being a copolymer of styrene and 2 per cent divinylbenzene in bead form and carrying as functional groups benzyl trimethylammonium groups.

As insulin starting material use is made of a salt cake which is obtained by extraction of beef pancreas glands with acidified ethanol in a conventional manner followed by neutralization, filtration, reacidification, evaporation, filtration and salting-out with sodium chloride. 40 ml of an aqueous solution of the salt cake containing 0.05 gram-equivalents per liter of chloride and containing in total about 300 mg of insulin (as measured by the yield of once crystallized insulin obtained in a conventional manner from a corresponding sample) are mixed with 292 mg of NaCl, 63 ml of 96 per cent (v/v) ethanol and 0.2 ml of a 0.5 M solution of ethylene diamine tetraacetic acid tetrasodium salt (respresenting an amount which is more than enough to combine with the insulin-binding metals present in the sample). The pH of the mixture is adjusted to 8.3 with about 0.15 ml of concentrated ammonia. The mixture is then centrifuged in order to remove a large precipitate, and the supernatant is applicated on the column. The elution is carried out with the buffer used for equilibration at a temperature of 22°C and at a rate of 44 ml/h. Fractions of about 15 ml are collected.

The extinctions at 276 nm are measured and plotted against the fraction numbers. The fractions corresponding to the central major part of the insulin peak, which appears between about 700 and 1,400 ml of the elvate, are pooled. The pH of the pool is adjusted to 7.0 with 4 N HCl and the insulin precipitated by adding one pool volume of 0.02 M zinc acetate. The precipitate is isolated by centrifugation and crystallized from an acetone-containing citrate buffer in a known manner. The yield of purified insulin is 145 mg. The insulin showed essentially a single component when analysed by DISC PAGE and also when subjected to gel filtration as described in Example 1.

The insulin furnished by my process may be used for preparing all kinds of pharmaceutical insulin preparations for clinical use, such as those referred to below.

In order to obtain a quick insulin action it is known to make use of an injectable aqueous solution of insulin. This solution has usually a pH-value of about 2 to 3, but there are also known insulin preparations consisting of an insulin solution having a pH-value of about 7 to 8. With respect to this last mentioned insulin solution reference may e.g. be made to the U.S. Pat. No. 3,091,573.

Also injectable insulin preparations are known in which insulin is combined with a compound making the insulin sparingly soluble at the pH-value of human blood and tissues. Examples of such compounds are protamine, globin and surface (bis-2-methyl-4-aminochinolyl-6-carbamide). A well-known preparation of this kind is an aqueous suspension of an amorphous precipitate of insulin and protamine in a zinc-containing medium. Another example is an injectable aqueous suspension of a compound of insulin and protamine in crystalline form.

Types of injectable insulin preparations which have found extensive use are aqueous suspensions containing insulin in crystalline and/or amorphous state. In such insulin crystal suspensions zinc ions are present in such an amount that the suspended insulin crystals contain at least 0.35 milliequivalent of zinc per gram of the crystals and the suspensions have a pH-value of about 7. In this connection reference may e.g. be made to the U.S. Pat. No. 2,882,202.

During the last decade use has also been made of an injectable aqueous suspension containing bovine insulin crystals having the shape of a sharp-edge rhombohedron bounded by plane crystal faces, the obtuse angle of each rhombus being between 114° and 115°. With respect to the production of such crystals reference may e.g. be made to the U.S. Pat. No. 2,920,014. The suspension of such bovine insulin crystals may also contain insulin in solution.

Finally, it is known that it is considered advantageous that the insulin crystals used in crystalline form in insulin crystal suspensions for injection are of substantially uniform size. This can be achieved as described in the U.S. Pat. Nos. 2,819,999 and 2,799,622. Such crystallization processes may be used in connection with the formulation of any purified insulin in insulin crystal suspensions for injection.

That the insulin purified by my process gives rise to no or materially reduced antigenicity has been demonstrated by both biological and clinical tests in which connection I refer to U.S. application Ser. No. 298,299 filed Oct. 17, 1972, said application being a continuation-in-part of U.S. application Ser. No. 845,345 filed July 28, 1969.

In order to illustrate how my purified insulin has been tested, reference is made to the following examples:

EXAMPLE A

Neutral Insulin injection 40 i.u./ml.

160 mg of pure porcine insulin prepared according to Example 3 are dissolved in 20 ml of 0.01 N hydrochloric acid. The solution is sterilised by filtration, and the filtrate mixed aseptically with 60 ml of a sterile aqueous solution containing 0.1 g of methyl-p-hydroxybenzoate. Finally, 20 ml of a sterile solution containing 136 mg of sodium acetate, 0.7 g of sodium chloride, and 10 mg of sodium hydroxide are added. The final preparation has a pH of about 7.3. It is filled aseptically in sterilised vials.

A group of 8 rabbits was given 3 injections per week of the preparation produced as described above (20 i.u. per injection with incomplete Freund's adjuvant) and the insulin antibody levels were followed as examined at regular intervals. The level is expressed as the percentage of added $^{125}$I-insulin (beef) bound to the antibodies in the sample, use being made of the following procedure:

100 μl of serum (undiluted or diluted 1:10), plus 100 μl of $^{125}$I-labelled beef insulin (100 μU./ml) plus 100 μl of buffer; incubation for 24 hours at 4°C and precipitation with ethanol as described by Heding (Horm. Metab. Res. 1, 145–46 (1969))

For comparison the same tests were repeated but with the use of a commercial preparation prepared as described above from commercial porcine insulin (crystallized five times). FIG. 2 illustrates the results of both test series and shows that insulin antibodies were developed in the treatment with the commercial preparation, whereas the preparation of Example A was non-immunogenic.

EXAMPLE B

Insulin Zinc Suspension 40 i.u./ml.

First the crystalline fraction of the preparation is prepared by the following method: 1.6 gram of pure insulin prepared according to Example 1 are dissolved in 75 ml of 0.02 N hydrocloric acid containing zinc chloride equivalent to 10 mg of zinc. The solution is sterilised by filtration and the filtrate mixed aseptically while stirring with 25 ml of a sterile solution containing 1.36 grams of sodium acetate, 7 grams of sodium chloride, and sufficient sodium hydroxide to produce a pH of 5.4 to 5.5 in the mixture. Stirring is continued for about twenty hours or until the pure insulin precipitated is converted into rhombohedral crystals. The suspension is then added aseptically with continuous stirring to 900 ml of a sterile solution containing zinc chloride equivalent to 70 mg of zinc, 1 gram of methyl-p-hydroxybenzoate, and sufficient sodium hydroxide to produce a pH of about 7.3 in the final crystalline fraction.

The amorphous fraction is prepared by the following method:

1.6 grams of pure insulin prepared according to Example 2 are dissolved in 100 ml of 0.02 N hydrochloric acid containing zinc chloride equivalent to 10 mg of zinc, the solution is sterilised by filtration and the filtrate diluted aseptically with 800 ml of a sterile solution containing zinc chloride equivalent to 70 mg of zinc and 1 gram of methyl-p-hydroxybenzoate. 100 ml of a sterile solution containing 1.36 grams of sodium acetate, 7 grams of sodium chloride and sufficient sodium hydroxide to produce a pH of about 7.3 in the final amorphous fraction are then added aseptically with continuous stirring.

The insulin zinc suspension is prepared by mixing aseptically 7 volumes of the crystalline suspension and 3 volumes of the amorphous suspension. The mixture is filled aseptically in sterilised vials.

For the purpose of clinical evaluation of the insulin zinc suspension prepared above from pure porcine insulin 18 diabetics previously untreated with insulin were adjusted on the preparation (average dose 22 i.u. per day at the time of the last blood sampling). Insulin antibody levels were followed from the beginning of the treatment and for a period of about 800 days using the method described by A.H. Christiansen (Horm. Metab. Res., 2, 187–188 (1970)).

Insulin antibodies were found to be absent or barely insignificant in all patients throughout the period of observation, vide FIG. 3.

For comparison a similar preparation produced as described above, but made from commercial porcine insulin (crystallized 5 times) was tested in 26 diabetics (average dose 22 i.u. per day), the diabetics being previously untreated with insulin, and the tests being carried out as explained in connection with FIG. 3. The results are compiled in FIG. 4, showing significant and substantial formation of insulin antibodies due to non-removal of the immunogenic material present in the commercial insulin used.

Having now particularly described and ascertained the nature of my said invention, and in what manner the same is to be preformed, I declare that what I claim is:

1. A process for reducing the antigenicity of the insulin that has been recovered from pancreas glands of domestic mammals and which contains insulin-like impurities, which comprises dissolving the insulin in a water-containing medium, adjusting the insulin solution to a pH-value within the range of 6 to 9, applying the insulin solution on a chromatographic column of an anion exchanger to fix the insulin to the column, fractionally eluting the column with an eluent containing water together with a water-miscible monohydric aliphatic alcohol in a concentration of 40 to 80 per cent (v/v), thereby separating the insulin from its impurities, collecting the insulin-containing fractions showing essentially a single component when analysed by discontinuous polyacrylamide gel electrophoresis (DISC PAGE), and recovering the insulin contained in the collected fractions.

2. A process as defined in claim 1, in which the insulin solution is adjusted to a pH-value within the range of 6.5 to 8.5.

3. A process as defined in claim 1, in which the alcohol concentration of the eluent is 50 to 70 per cent (v/v).

4. A process as defined in claim 1, in which the eluent has almost the same pH-value as that of the insulin solution applied to the column.

5. A process as defined in claim 1, in which the eluent has almost the same pH-value as that of the insulin solution applied to the column and the elution is effected without changing the ion strength of the eluent applied to the loaded column.

6. A process as defined in claim 1, in which the insulin has been recovered from pork pancreas glands.

7. A process according to claim 1, in which the insulin has been recovered from bovine pancreas glands.

8. A process as defined in claim 1, in which the anion exchanger is a strongly basic anion exchanger.

9. A process according to claim 1, in which the eluent has almost the same pH-value as that of the insulin solution applied to the column and the elution is effected without changing the pH-value of the eluent.

10. A process according to claim 1, in which the column is equilibrated with a buffer solution having a similar composition as that of the eluent before the insulin solution is applied to the column.

11. A process for reducing the antigenicity of commercial or crude insulin recovered from pancreas glands and containing insulin-like impurities having a molecular weight of about 6,000, which comprises preparing a buffer solution containing water together with a water-miscible monohydric aliphatic alcohol in a concentration of 40 to 80 per cent (v/v) and having a pH-value within the range of 6 to 9, applying said buffer solution of a chromatographic column of an anion exchanger and equilibrating the column with the buffer, dissolving the crude or commerical insulin in a water-containing medium, adjusting the insulin solution to a pH-value within the range of 6 to 9, applying said insulin solution to the column, eluting the column in fractions with an eluent containing water together with a water-miscible monohydric aliphatic alcohol in a concentration of 40 to 80 per cent (v/v) and having a pH-value within the same range as that of the equilibrating solution, collecting the fractions showing essentially a single component when analysed by discontinuous polyacrylamide gel electrophoresis (DISC PAGE) and recovering the insulin contained in the collected fractions.

12. A process as defined in claim 11, in which the alcohol in the eluent is in a concentration of 50 to 70 per cent (v/v).

13. A process for reducing the antigenicity of insulin recovered from pancreas glands of domestic mammals and containing antigenic impurities, which comprises fractionally eluting a chromatographic column of an anion exchanger having the insulin fixed thereto with an eluent containing water together with a water-miscible monohydric aliphatic alcohol in a concentration of 40 to 80 per cent (v/v), collecting the eluate fractions containing insulin essentially free of the antigenic impurities, and recovering the insulin from the collected fractions.

* * * * *

UNITED STATES PATENT OFFICE
CERTIFICATE OF CORRECTION

PATENT NO. : 3,907,676
DATED : September 23, 1975
INVENTOR(S) : Klavs H. Jørgensen It is certified that error appears in the above-identified patent and that said Letters Patent are hereby corrected as shown below:

On the cover page, under the list of "Other Publications", change "Azeab" to --Azerb-- and "ZH" to --Zh.--

With respect to the date of Heftmann's "Chromatography", change the date from "1962" to --1961--

Column 1, line 24, "fractioned" should be --fractionated--

Column 3, line 17, "eleectrophoresis" should be --electrophoresis--

Column 3, line 29, "elvent" should be --eluent--

Column 4, line 21, after "containing" insert --water and a--

Column 4, line 62, "registeration" should be --registration--

Column 4, line 64, "elvate" should be --eluate--

Column 5, line 46, end of line - after "rate" insert --of--

Column 6, line 29, "HCL" should be --HCl--

Column 7, line 62, before "anion" insert --the--

Column 8, line 49, change "tris(hydroxymethol-" to --tris(hydroxymethyl)- --

Column 8, line 50, delete ")"

Column 8, line 63, "elvate" should be --eluate--

Column 9, line 56, "elvate should be --eluate--

Column 10, line 13, "surface" should be --surfen--

Signed and Sealed this tenth Day of February 1976

[SEAL]

Attest:

RUTH C. MASON
Attesting Officer

C. MARSHALL DANN
Commissioner of Patents and Trademarks